United States Patent [19]

Sullivan et al.

[11] Patent Number: 4,674,204
[45] Date of Patent: Jun. 23, 1987

[54] SHOCK ABSORBING INNERSOLE AND METHOD FOR PREPARING SAME

[76] Inventors: James B. Sullivan, 343 Main St., Dennisport, Mass. 02639; Richard B. Fox, 40 Tri Town Cir., Mashpee, Mass. 02649

[21] Appl. No.: 785,667

[22] Filed: Oct. 9, 1985

Related U.S. Application Data

[63] Continuation-in-part of Ser. No. 470,638, Feb. 28, 1983, Pat. No. 4,581,187.

[51] Int. Cl.$^4$ .................. A43B 13/40; B29C 67/22
[52] U.S. Cl. .................................. 36/44; 264/46.4; 264/244
[58] Field of Search .................. 264/46.4, 244; 36/44

[56] References Cited

U.S. PATENT DOCUMENTS

| | | |
|---|---|---|
| 2,346,279 | 4/1944 | Stritter . |
| 3,187,069 | 6/1965 | Pincus et al. . |
| 3,233,348 | 2/1966 | Gilkerson . |
| 3,530,489 | 9/1970 | Appleton .............................. 36/44 |
| 3,781,231 | 12/1973 | Janssen et al. . |
| 4,003,146 | 1/1977 | Meier et al. ............................. 36/44 |
| 4,296,053 | 10/1981 | Doerer et al. ................. 264/46.4 X |
| 4,581,187 | 4/1986 | Sullivan et al. ..................... 264/46.4 |

FOREIGN PATENT DOCUMENTS

| | | |
|---|---|---|
| 0117758 | 9/1984 | European Pat. Off. . |
| 2015914 | 4/1970 | France . |
| 2272618 | 12/1975 | France . |
| 2309169 | 11/1976 | France . |
| 2427801 | 1/1980 | France . |
| 2057964 | 4/1981 | United Kingdom . |

*Primary Examiner*—Philip Anderson
*Attorney, Agent, or Firm*—Richard P. Crowley

[57] ABSTRACT

A shock-absorbing innersole for use in footwear, which innersole comprises an innersole body composed of a substantially nondeformable elastomeric-type urethane cellular polymer, having a contoured molded heel and arch section and a substantially flat sheet containing a ball and toe section, the innersole having one or more shock-absorbing inserts in the innersole positioned in the heel, ball or both areas of the innersole, the insert composed of a solid elastomeric polymer which has greater shock-absorbing properties and greater surface tack than the elastomeric urethane of the innersole body.

27 Claims, 7 Drawing Figures

SHOCK ABSORBING INNERSOLE AND METHOD FOR PREPARING SAME

REFERENCE TO PRIOR APPLICATION

This application is a continuation-in-part of application of U.S. Ser. No. 470,638, filed Feb. 28, 1983, now U.S. Pat. No. 4,581,187, issued Apr. 8, 1986 hereby incorporated by reference in its entirety.

The parent application relates to an elastomeric foam sheet innersole and a method of preparing the innersole. The innersole has a molded elastomeric polyurethane foam heel and arch section directly bonded to a flexible foam or solid, shoe upper material. The innersole is prepared by employing a mold composed of male and female sections adapted to be placed in an open and a closed position, which mold defines at least one contoured shoe heel and arch section mold cavity, and introducing into the mold cavity in the open position a premixed amount of an expandable and reactable elastomeric polyurethane material in the presence of a layer of a sheet material, and closing the mold and permitting the polyurethane material introduced to expand and react in a curing action into contact with the innersole sheet material, and, thereafter, removing from the mold the formed innersole sheet material and cutting the sheet material into a desired footwear shape.

The innersole comprises a contoured heel and arch section, to provide support and cushioning to the foot, and has a generally flat lower surface, with the heel and arch section contoured, to provide for a contoured arch section and a heel cup section, both composed of a unitary, molded, resilient, elastomeric, substantially nondeformable, open-cell, polyurethane foam material with low compression set. The innersole sheet material has the general shape of a foot, the sheet material directly bonded, during the molding process, to one surface of the heel and arch section. The innersole sheet material employed is typically a fabric-type material or a foam layer, such as latex, polyurethane or vinyl foam, or a combination of a top surface composed of fabric-type material and an intermediate layer of a foam bonded to the top surface of the contoured heel and arch section of the innersole.

BACKGROUND OF THE INVENTION

Shoe innersoles are employed with articles of footwear for a variety of purposes, such as to provide comfort, distribution of weight, arch or heel support and insulating qualities. Innersoles may be employed in athletic, jogging or running shoes and in general footwear, as well as in boots, such as mountain, hiking and cross-country boots, and in other footwear.

An innersole for an athletic shoe is described, for example, in U.S. Pat. No. 4,187,621, wherein the innersole comprises a laminate of two layers which is cut and conformed in contour to the last shape of the shoe, and which has an upper layer and a lower layer of different and defined compression sets. Typically, both of the upper and lower layers comprise cross-linked, closed-cell polyethylene polymers of different densities. However, it has been found that the polyethylene foam employed in such innersoles is not wholly satisfactory, since the polyethylene foam tends to break down in use, due to the poor compression set of the polyethylene foam, with a considerable reduction in cushioning, particularly in the heel section and the ball section of the foot, which tends to reduce cushioning to unsatisfactory comfort levels. Also, this laminate, while permitting the two-layer foam material to conform to the shape of the wearer's foot, does not provide adequate breathing properties.

Various polymers, including polyurethane foam materials, have been suggested for use in innersoles. For example, U.S. Pat. No. 3,781,231, issued Dec. 25, 1973, describes a resilient, cross-linked, hydrophilic, open-cell, polymer foam material which may be used to cast foams of varying thickness, and the innersoles may be cut to shoe-sole shape from sheets of the cast foam. Other shoe innersoles have been prepared having a laminated construction, such as described in U.S. Pat. No. 3,730,169, wherein a laminated cushion innersole is described as comprising an upper layer of generally smooth, low-friction material, the bottom layer of a generally resilient material, and an intermediate, permanently deformed cushion layer comprising an open-cell, polyurethane foam material. The innersole requires three separate layers of flat sheet material, with the object being to have the innersole deformed permanently on wearing, to conform the innersole to the shape of the wearer's foot; that is, to prepare a self-shaping innersole. The polyurethane material provides for plastic deformation to conform to the foot shape, while the bottom layer is adhesively secured to form a nonskidding layer.

Other flat-type, multiple-layer, inersole materials are described, for example, in U.S. Pat. No. 4,055,699, which innersole requires a dense, cross-linked polyolefin layer and an aluminum-coated moisture barrier layer, to provide insulation to the foot of the wearer. A protective insert for a shoe is also described in U.S. Pat. No. 3,638,336, wherein a foam closed-cell layer is laminated to a face layer of fabric, with the insert being contoured to conform to the innersole of the shoe, and having a sculptured heel portion to cup the heel of the wearer in use. Another innersole designed for heat insulation is described in British specification No. 1,243,575, wherein a flexible backing of leather or synthetic plastic material is secured to a heat-insulating layer of expandable polyethylene.

While prior innersoles, for use in articles of footwear, have been satisfactory generally for certain specific purposes, there are disadvantages associated with such innersoles, such as the breaking down of the foam layer with closed-cell, polyethylene-type innersoles, and the problems associated with the cost of laminating, forming and manufacturing the other innersoles. Therefore, there is a need for an improved innersole material and method of manufacture, which provides additional advantages and overcomes at least some of the disadvantages of the prior-art innersoles and methods.

SUMMARY OF THE INVENTION

The invention relates to a shock-absorbing innersole and to a method of manufacturing and using such innersole. In particular, the invention concerns a shock-absorbing innersole composed of a molded, polymeric, foam heel and arch section, and which contains shock-absorbing inserts in the ball, heel or both sections composed of a polymer having greater shock-absorbing properties and surface tack than the polymer employed in the molded heel and arch section.

An improved shock-absorbing innersole has been discovered for use in footwear which has improved structural and design characteristics and shock-absorbing properties, and which provides specific cushioning support. The innersole comprises a molded, polymeric foam-molded heel and arch section formed of a substantially nondeformable, open-cell, elastomeric-type polymer, such as an elastomeric polyurethane material, of low and defined compression set, and shock-absorbing inserts which are positioned generally in the lower surface of the innersole in the heel or ball section of the innersole, or in both sections. The shock-absorbing inserts are composed of a solid elastomeric polymer which has different, but better, shock-absorbing properties than the polymeric material employed in preparing the molded heel and arch section of the rest of the innersole. Where ball and heel inserts are employed, the shock-absorbing and other properties, such as tack, may be the same or different.

It has been found that the elastomeric material employed in the heel and arch section, such as a molded, open-cell, elastomeric polyurethane, is not subject to rapid breakdown and loss of cushioning during use as some prior-art innersoles, and that such material provides a heel and arch section of superior cushioning and support for the heel and arch of the foot of the wearer. The molded material may be extended to the full sole shape of the innersole, rather than only to the heel and arch section, and generally is bonded directly in the molding process, without the use of other adhesives, which is optional, to a flexible shoe-upper material during the molding process. The bonded upper material comprises, but is not limited to: a soft, flexible, breathable material, such as a fabric or fabric-type material; or to another open-cell-type foam material, such as a vinyl foam, a urethane foam, a rubber latex foam or the like; or to a combination wherein the upper surface of the innersole material comprises a fabric, together with an intermediate layer of a foam material and a lower layer of the molded heel and arch material.

The innersole comprises shock-absorbing inserts, which inserts are generally composed of an elastomeric-type polymer which has different properties than the properties employed in the polymer used to prepare the molded heel and arch section, such as, but not limited to, a solid elastomeric polymer, such as another polyurethane material. The polymeric material employed for the inserts should have greater or better shock-absorbing properties; that is, to be less resilient, than the elastomeric material employed in preparing the remainder of the innersole, and optionally, but preferably, have greater and high surface tack. The combination of elastomeric polymers employed to provide an innersole provides both cushioning and support, as well as superior shock resistance, in those areas of the foot as required, particularly where the innersole is employed in athletic-type footwear, such as jogging shoes, running shoes, tennis shoes, outdoor shoes, boots and the like, wherein both comfort and shock absorbence are desired.

The method of manufacturing the shoe innersole of the invention in one embodiment comprises an open-molding technique in which the substantially nondeformable, expandable polymer, such as an elastomeric urethane, is introduced into an open mold cavity, to surround and encapsulate one or more shock-absorbing, preformed inserts placed in the mold cavity and which are to form part of the innersole, and also to bond directly in the molding process the flexible upper material of the innersole to the introduced polymer. Typically, the insert material is precut from a polymeric sheet material to the particular shape and size for use as a shock-absorbing material and then placed in the proper position in the open mold cavity, either before or after the introduction of the expandable polymer. Where the insert is introduced into the mold cavity first, the expandable polymer is then introduced into the mold cavity, and then the flexible sheet material is placed on top of the introduced expandable polymer and the mold placed in a closed position, to permit the expandable polymer to expand and, therefore, to bond directly the top sheet material to the cellular expanded polymer and to encapsulate the insert. In another technique, the flexible top sheet material may be introduced into the mold cavity, the expandable polymer then introduced on top of the top sheet material, and then the precut inserts are placed quickly in position and the mold then placed in the closed position. The expandable polymer reacts and expands and forms an integral, substantially nondeformable, open-cell, contoured mold heel and arch section and forms the remainder of the foot innresole as typically a flat sheet material, for example, ranging in thickness from about $\frac{1}{8}$th of an inch to $\frac{1}{4}$th of an inch, and, in the reaction expanding process in the mold, encapsulates and secures the insert and directly bonds the lower surface of the flexible top sheet material to the top surface of the expanded polymer.

Thus, the improved innersole provides for a unique integral bonded innersole, with the flexible top sheet and the positioned inserts integrally bonded to the cellular polymer. The innersole has a contoured heel and arch section therein composed of a substantially open-cell and substantially nondeformable elastomeric polymer, and more particularly an elastomeric polyurethane polymer, which polymer has been expanded in situ in a closed mold during the molding process, to form the contoured heel and arch section, and also to form the remaining flat-sheet section of the full sole portion. Where the top sheet material comprises a fabric-type material, such as a knitted or woven fabric, having interstices therebetween, or an open-cell foam layer, the expanding and reacting polymer is forced into the interstices of the fabric or into the open-cell surface portion of the foam layer, to form a strong, effective bond during the in situ molding process.

The shock-absorbing insert material employed in the molding technique may comprise a variety of polymers, both solid and cellular, provided that the insert provides for less resilient or more shock-absorbing properties than the expandable polymer employed for the contoured heel and arch section, and further preferably that such polymer has a greater surface tack. The insert material is usually an elastomeric-type polymer, such as a natural or synthetic rubber like butyl rubber, nitrile rubber, ethylene-propylene copolymers, polybutadiene, natural rubber, SBR rubber and similar shock-absorbing polymers, or may comprise an elastomeric polyurethane or other polymers. The less resilient nature of the polymer could be derived from either a solid insert or a cellular insert typically of high cellular densities, such as, for example, over 10 pounds per cubic foot, and which has high compressive strength and tear strength, so as to absorb the shock in walking, running and other activities. Generally, the insert is precut from a flat sheet material; for example, about $\frac{1}{8}$th to $\frac{1}{4}$th of an inch in thickness, and more typically a solid sheet material, to a desired shape and used in the heel or ball section of the innsersole, or more typically in both sections.

Generally, the insert extends across a substantial portion or all of the ball section of the innersole and may assume various shapes and thicknesses. The ball insert may or may not extend to the outer edge of the innersole. The heel insert is typically placed in the heel section surrounded by the integrally molded polymer of the heel. It is desirable to have a tacky surface for the insert for advantages both in the molding process and in the subsequent insertion of the innersole within the footwear. Where the insert is of a tacky nature, the insert therefore is adherent to the mold surface within the female cavity of the mold or to the flexible sheet material, and the subsequent introduction of the expandable reactable polymer into the mold does not move the tacky insert; thus, permitting the expandable reactable material to be inserted about and over the insert, without moving the insert within the mold. Further, in use, the tacky surface nature of the insert is desirable, in that, once the innersole is placed within the footwear in which it is to be used, the outer, bottom, tacky surface of the insert of the innersole prevents undesirable movement of the innersole within the footwear. In one preferred embodiment, the insert is composed of an elastomeric urethane, having a very tacky feel to the hand, and is cut from a solid sheet which generally has a slightly less thickness than that of the cellular polymer. The cellular polymer preferably is a substantially nondeformable, elastomeric urethane of greater resilience and little, if any, surface tackthan the solid insert and of low compression set. Preferably, both the insert and the foam body of the innersole are elastomeric polyurethanes.

The polyurethane polymers employed in the present invention, either as the solid or foam insert or open-cell foam body, comprise those polyurethane elastomers prepared typically by reaction of methylene diisocyanate or toluene diisocyanate with polyols, which either can be polyethers or polyesters, and preferably polyesters, to prepare a polymeric elastomer having an average molecular weight generally of about 1,000 to 10,000; for example, 4,000 to 8,000. The polyurethane elastomers may be made with various diol extenders and may be cured with a variety of curing agents, such as diamine compounds alone or in various blends. The urethane elastomer uses a curing agent, such that the elastomer cures with time and provides essentially linear cross-linked polymers. The expandable polyurethane elastomeric composition used in the mold is usually a two-part composition mixed usually just prior to or on injecting or pouring into the mold cavity, so that all or substantially all of the reaction occurs within the mold cavity after injection. One component comprises the isocyanate and typically the other component comprises a polyol, a curing catalyst, a blowing agent and, if required, cell-control surfactants and various other additives, to improve specific properties of the urethane elastomers; for example, fillers, fibers, ultraviolet-light absorbers, oxidation inhibitors, stabilizers, antioxidants, etc. Microcellular polyurethane elastomers; for example, from about 3 to 30 pounds per cubic foot, such as from 4 to 20 pounds, are typically produced by the reaction of components containing water, halocarbons or azo compounds, so as to form a foamable, elastomeric resin polymer. The reaction typically proceeds in the closed mold with a rise in temperature or an exotherm, and, thereafter, the elastomeric polymer is cured. The formulations of foamable or expandable, elastomeric, cured polyurethane polymers are well known.

A wide variety of sheet materials may be employed as the sheet material of the innersole, to include solid, cellular and fabric-type, flat-sheet upper material, depending upon the particular use for the innersole material. For example, various urethane, vinyl and rubber-latex, flat-sheet solid or preferably foam layers may be employed, either alone or having one or both surfaces laminated or adhesively secured or otherwise formed to a fabric-type layer, such as a knitted or woven fabric layer, such as a cotton, polyester innersole. In addition, the sheet material may comprise a solid, flexible layer, such as one composed of urethane or vinyl sheet material having an imitation-leather, upper-surface appearance, or which may be secured to a fibrous sheet material, such as a woven or knitted fabric. In addition, the innersole material may comprise a flexible, upper sheet material of natural or synthetic; that is, man-made, leather, such as of a thin, natural leather having a finished upper surface and a lower rougher surface; for example, a smooth-finished or suede-like surface, either on the upper or lower surface.

One type of solid polyurethane polymer suitable for use as insert material comprises the elastomeric urethane known as Sorbothane, the general composition of which is described in U.S. Pat. No. 4,346,205, and its use as a contoured molded device polyurethane to form a shock absorbing type insole is described in U.S. Pat. No. 4,541,184 of Sept. 15, 1985, both patents herein incorporated by reference. The elastomeric material is a non-cellular polyurethane of essentially linear structure containing unsatisfied hydroxyl groups, having the following properties; a compression set of less 15%, e.g. less than 5%; an elongation at break of at least 500%; a recovery delayed after compression by at least 0.7 seconds; and a Shore hardness (scale 00) of 10 to 80, e.g. 20 to 70, and which material is sticky or tacky in surface properties.

The foam materials employed as the flexible sheet material may comprise open-cell-foam-type, flat-sheet layers, typically such as open-cell, rubber-latex-type material or a vinyl-coated fabric, such as Capilair (a product of Uniroyal, Inc.), or other material, such as an open-cell urethane, which is a polymeric-type material which has the ability to absorb moisture and to breathe; thus making the upper sheet material in footwear more comfortable and hygenic. Often such polymeric material contains an interconnecting, open network of microscopic cells or channels, and may extend throughout the depth of the material, with the outer surface of the material being hydrophobic and, thus, water-repelent. Such polymeric materials may include a foam layer and an abrasion resistant top surface of polyester or cotton backings on one or both surfaces thereof. Generally, it is desirable to provide an upper, flexible material having a rough, rather than a smooth, back surface in contact with the expandable, elastomeric polyurethane material, in order to provide improved adhesive strength between the contoured heel section and the upper material.

In the method of manufacture, the two-component or multiple-component elastomeric urethane is mixed just prior to introduction into the mold cavity. An upper, flexible sheet material is placed in the female mold cavity, either before or after introduction of the premixed polymer, and prior to full expanding and full curing of the elastomer, so that the expandable, curable, elastomeric resin expands into close, intimate bonding contact with one lower surface of the sheet material in the closed mold cavity, and then cures at least partially in the mold.

Generally, the urethane exotherm in the molds is 120° F. or greater and the curing takes place, to provide an expandable, at least partially cured elastomeric polyurethane foam in a time period of from about 1 to 15 minutes, such as from 2 to 12 minutes, with full curing occurring generally during the next 12 to 24 hours, which, of course, may be accelerated by the employment of heat. The elastomeric, cured foam material, comprising the heel or the remaining section, typically has a compressive strength of at least about 15 pounds or greater and has a low compression set, so that it is substantially nondeformable during use by the wearer, such as an ASTM compression set not greater than about 20%; for example, less than 10%. More typically, the cured urethane foam is substantially open-cell in nature, is thermosetting or at least partially cured or fully cured, and has a low foam density; for example, 4 to 20 pounds per cubic foot.

The improved, shock-absorbing, contoured innersole of the invention and the process of preparing the same will be described for the purpose of illustration only in connection with certain embodiments; however, it is recognized that various changes, additions and improvements may be made to the illustrated innersole material and process, all without departing from the spirit and scope of the invention.

DESCRIPTION OF THE EMBODIMENTS

Figure 1:
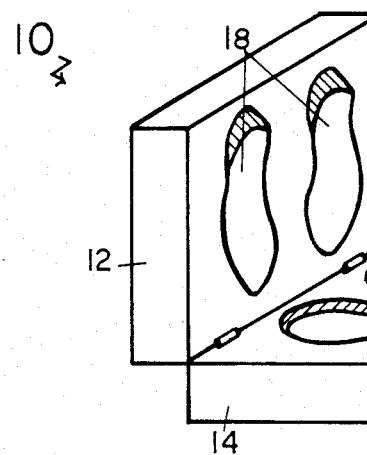
FIGS. 1-3 represent schematic illustrations of the steps of the process of preparing the shock-absorbing shoe innersole of the invention.

FIG. 1 shows an open-closed molding system 10 comprising an open mold having a male mold section 12 and a female mold section 14, with dual, contoured heel and arch female-cavity section 16 and male contoured section 18, which mold sections form a dual mold cavity of desired size of a full innersole shape. FIG. 1 shows the employment of a thin, blister-like, rigid, translucent, polypropylene resin sheet insert 20 containing a section 22, to match the dual female cavity section 16 in the female mold 14. In use, a mold-release lubricant may be employed in connection with female and male mold cavities 16 and 18; however, the employment of a thin, female-mating, blister-type polypropyelene resin or other olefinic resin insert 20, employed in the female mold 14 to match the female cavity 16, is desirable, since the dual mold section 20 may be removed, together with the dual molded block sheet, directly from the open mold cavity. FIG. 1 shows the mold in an open, hinged position, with the insertion of the polypropylene resin insert 20 in the female molding, with a shock-absorbing ball 60 and heel 62 positioned in place in the female cavity 16. The inserts 60 and 62 are precut from a flat sheet of a solid, tacky, elastomeric polyurethane with a low resilience and of a shock-absorbing nature. For example, the tacky, shock-absorbing, urethane inserts 60 and 62 may comprise a urethane material known as Sorbothane (a trademark of Spectrum Sports, Inc. of Twinsburg, Ohio), or Intercept (a trademark of B and H Manufacturing Co. of Duquoin, Ill.). The inserts have a thickness of about 3/16ths to ¼th of an inch and may, if desired, have a color different from that of the expandable urethane which forms the body of the innersole, to accentuate and illustrate the shock-absorbing insert pads. The inserts 60 and 62 may vary in shape, but, as illustrated, the heel insert 62 has a general egg shape to cover the heel surface area, and may comprise a skewed egg shape, with more shock-absorbing material positioned toward the outer side of the heel. The ball insert 60 may comprise, as illustrated, a band with a fan shape toward each edge and extend to the edge of the female cavity 16 of the mold, or merely be an oval-type band extending across a substantial part of the ball surface.

Figure 2:
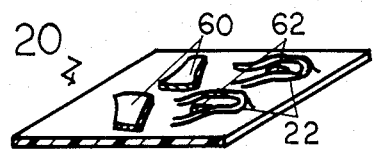
Figure 2:
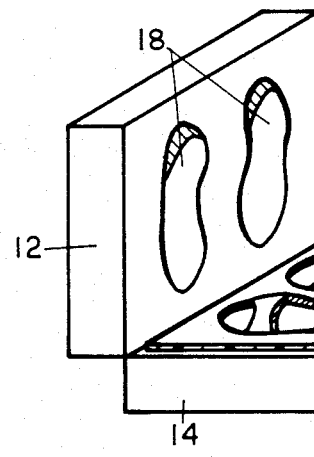

FIG. 2 illustrates the mold sections 12 and 14, with the mold in the open position and with the polypropylene resin insert 20 in position in the female-mold section 14 and the inserts 60 and 62 in place. The illustrations as to FIGS. 1 and 2 are to a dual mold cavity; however, it is recognized that single- or multiple-mold cavities may be employed as desired. Further, FIGS. 1 and 2 are directed to a manual-type operation; however, it is recognized that the mold sections 12 and 14 may be placed on a linear conveyer belt or a round table, or otherwise the operations can be formed in a sequential, periodic or continuous manner. FIG. 2 illustrates the injection of a two-component, premixed, expandable, elastomeric polyurethane polymer 24 directly into each of the female cavities 22 of the insert 20 and over and about the inserts 60 and 62. After injection of the expandable urethane, a reaction occurs with the generation of an elastomeric foam, with an exotherm occurring by the reaction of components which are premixed just prior to injection into the mold cavity 16. After injection of the predetermined amount of the polyurethane and prior to the full expanding and curing and generally immediately thereafter, such as from 1 to 15 seconds later, a flat, flexible sheet material 26, to be employed as an upper sheet, is introduced and placed over and on top of the insert 20 and over the cavities 22 containing the reacting polyurethane 24.

Sheet material 26 comprises, for the purpose of illustration, a fabric top surface 36, typically, for example, a woven cotton or a knitted polyester-type material bonded or secured to a layer of a vinyl or a latex open-cell foam 50. In the process illustrated in FIG. 2, the sheet material 26 generally is greater in size than the female mold cavity 16 and is not yet shaped into a foot shape, but rather is used in block form. However, it is recognized that, if desired, the upper flexible sheet material 26 may be employed in the desired foot-shape form. In the process illustrated, the block form material 26 is placed over the insert 20, prior to closing the mold. The flexible sheet material 26, of course, may comprise a thin, solid material, such as from 3 to 60 mils or lower, a foam material; for example, from 5 to 200 mils, or merely a fabric material or any combination thereof. The sheet material 26 selected for use must be capable of being bonded directly to the elastomeric urethane material. If desired, a nonskid fabric material may be employed with the multiple-layer material, with the fabric or nonskid material forming the bottom surface of the sheet material.

Figure 3:
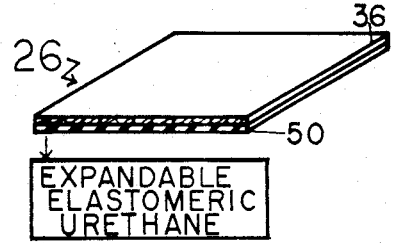
Figure 3:
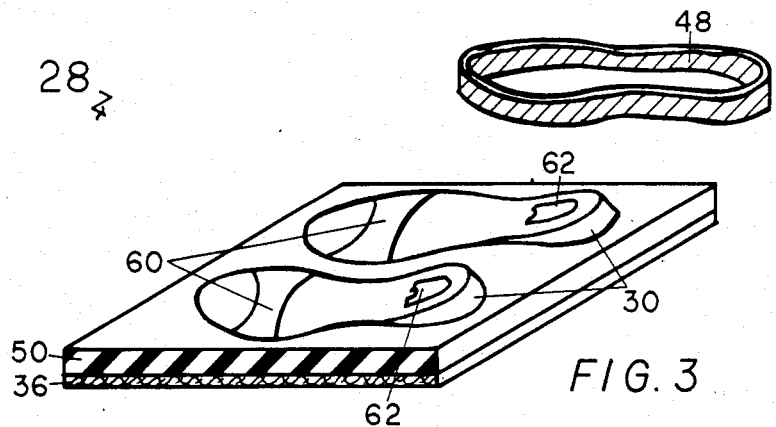

FIG. 3 is a schematic illustration showing a blocker sheet 28 as removed from the open mold after the reaction, containing two, preformed, cured, contoured, molded, elastomeric foam, polyurethane heel and arch sections 30 directly bonded to the bottom foam surface of the sheet material 26. In FIG. 2, the mold is closed, and the elastomeric polyurethane material 24 is allowed to react and to expand directly into contact with the bottom surface of the sheet material 26 and, on curing, to bond directly thereto. The insert 20, with the blocker sheet 28 therein, is removed from the open mold after the molding operation, and the blocker sheet 28 is easily stripped from the insert 20 and the cavities 22, without the need to employ mold-release agents. If desired, curing of the elastomeric urethane may be accelerated by preheating the mold or the surface of the mold, or later by placing the blocker material 28 in an oven to accelerate curing, or retained in storage for 12 to 24 hours to complete curing. After removal of the blocker sheet 28, a cutting operation, such as the employment of a die cutter 48, is used, to stamp out the shoe innersole having the desired shape and size, with the shoe innersole shown in dotted lines on the blocker sheet 28.

Figure 4:
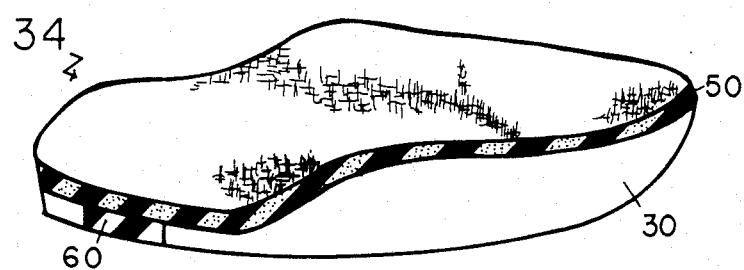
FIG. 4 is a perspective view of a contoured shoe innersole of the invention.
Figure 5:
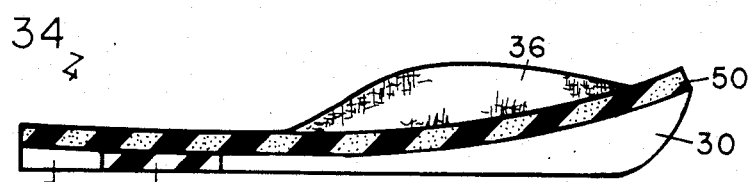
FIG. 5 is a side plan view of the innersole of FIG. 4.
Figure 6:
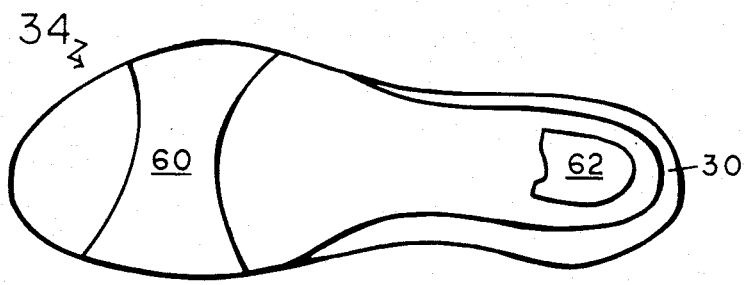
FIG. 6 is a bottom plan view of the innersole of FIG. 4.

The shoe innersole 34 produced by the process of FIGS. 1-3 is illustrated in FIGS. 4-6. The innersole 34 has an upper, woven fabric surface 36 which is contoured in shape to the upper portion of the heel, with the heel section 30 formed of a cured, nondeformable, urethane elastomeric foam material of about 8 to 12 pcf density and generally having a flat bottom section and another smooth skin layer. FIG. 5 is a sectional view of the innersole 34 of FIG. 4, which shows the bottom surface 38 formed of the foam layer 50, and showing the urethane heel and arch sections contoured just generally under the arch, to meet in a gradual, tapered manner the flat bottom surface of the foam section 38 and ball insert 60.

FIG. 6 is a bottom plan view of the innersole 34, showing the flat bottom surface 38 and urethane elastomeric heel and arch sections 30 extending from one to the other sides of the forward part of the arch of the foot, with the elastomeric urethane foam formed under the arch of the foot. The generally uniform foam layer 50 extends around the entire peripheral portion of the heel and under the arch of the foot, to provide arch support and comfort, and is bonded to the foam urethane which extends the length of the sole. The ball insert 60 and heel insert 62 are shown as encapsulated by the urethane foam 30.

Figure 7:
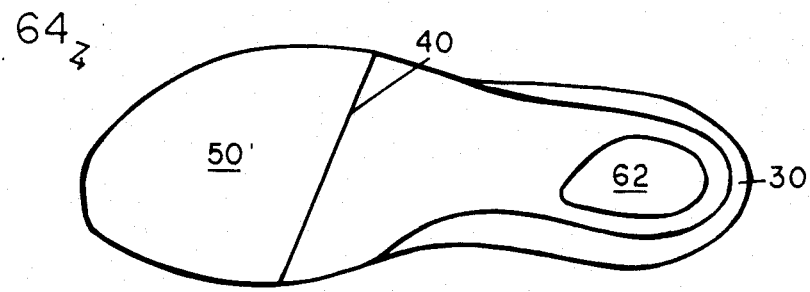
FIG. 7 is a bottom plan view of another shoe innersole of the invention.

FIG. 7 is a bottom plan view of a modified innersole 64 in which the foam urethane 30, introduced into the mold, forms a half sole, with the flat sheet material 26 forming the remaining portion of the full sole. The diagonal line 40 illustrates the tapered line where the molded urethane foam 30 is tapered into the flat surface of the sheet material 26. The half innersole 60, as illustrated, has a solid, shock-absorbing, heel insert 62.

Thus, there is provided a unique, inexpensive, improved, molded innersole with shock-absorbing inserts suitable for use in articles of footwear for comfort, heel support and shock-absorbing properties.

What is claimed is:

1. In a method of manufacturing a shock-absorbing, molded innersole for insertion in footwear, which method comprises:
   (a) introducing an expandable, polyurethane into a mold; and
   (b) recovering from the mold an innersole which comprises a contoured heel and arch section composed of a substantially open-celled polyurethane foam material, the improvement which comprises:
      (i) placing an elastomeric insert material into the mold, the insert material having greater shock-absorbing properties and being less resilient than the molded, open-celled polyurethane foam material, and the insert material having sufficient surface tack to remain in the placed position in the mold on the introduction of the expandable polyurethane material so as to permit the expandable polyurethane material to expand about the insert material without displacement of the insert material; and
      (ii) recovering a molded innersole with the insert material having a tacky surface forming a part of the exposed bottom surface of the recovered innersole.

2. The method of claim 1 which includes:
   (a) providing a mold composed of male and female sections to define a contoured mold cavity, the mold sections adapted to be placed in an open position and a closed postion;
   (b) introducing the expandable polyurethane material and placing the insert material into the mold cavity when the mold is in the open position;
   (c) closing the mold to permit the expansion and reaction of the polyurethane material; and
   (d) opening the mold to obtain a molded, open cell polyurethane material with the tacky insert therein.

3. The method of claim 1 which includes cutting the recovered molded innersole to the desired shoe form and size.

4. The method of claim 1 which includes placing the tacky insert material onto a surface of the mold prior to the introduction of the expandable polyurethane material.

5. The method of claim 1 which includes:
   (a) placing a flexible sheet material in the mold; and
   (b) placing the tacky insert material on the flexible sheet material prior to introducing the expandable polyurethane material.

6. The method of claim 1 wherein the insert material comprises a cellular material having a density of greater than about 10 pounds per cubic foot.

7. The method of claim 1 wherein the insert material is characterized by an elongation at break of at least 500%.

8. The method of claim 1 wherein the insert material is characterized by a recovery delayed after compression of at least 0.7 seconds.

9. The method of claim 1 which includes molding a molded polyurethane material which comprises a full innersole form.

10. The method of claim 1 wherein the polyurethane foam material has a foam density ranging from about four to twenty pounds per cubic foot and a compressive strength of greater than about 15 psi and a low compression set of less than about 20%.

11. The method of claim 1 which includes introducing a flexible sheet material into the mold and directly bonding the flexible sheet material as a top surface sheet material to the open-celled, polyurethane foam material.

12. The method of claim 11 wherein the flexible sheet material comprises a fabric sheet material, a foam sheet material or a solid sheet material or combinations thereof.

13. The method of claim 11 wherein the flexible sheet material comprises a layer of open cell foam material and wherein the expanding polyurethane material is forced into the open cell surface of the open cell foam layer to form a strong bond between the open cell foam material and the molded polyurethane material.

14. The method of claim 11 which includes molding a molded polyurethane material which comprises a half innersole form the mold polyurethane tapering into the top surface flexible sheet material.

15. The method of claim 1 wherein the insert material comprises a solid elastomeric, polymeric material.

16. The method of claim 15 wherein the polymeric material comprises a polyurethane polymeric material.

17. The method of claim 1 wherein the insert material is precut from a polymeric sheet material in a particular shape and size for use as a shock material which includes placing the insert material in the mold, either before or after the introduction of the expandable polyurethane material.

18. The method of claim 1 wherein the insert material is placed in a mold in the heel or ball or both sections of the innersole.

19. The method of claim 1 wherein the insert material is placed in the mold to form a heel section surrounded by the foamable polyurethane material in the innersole.

20. The method of claim 1 wherein the insert material is placed to extend across a substantial portion or all of the ball section of the innersole.

21. The method of claim 1 which includes precutting the insert material from a flat sheet material of from about one-eighth to one-quarter inch in thickness.

22. The method of claim 1 wherein the insert material comprises a non-cellular polyurethane having a Shore hardness on a scale of zero-zero of ten to eighty.

23. The method of claim 1 wherein the insert material is placed so as to form a shock-absorbing section in the heel section of the innersole and which insert material forms a generally hourglass-type shape and extends generally to or substantially toward the outer edge of the innersole material.

24. The molded innersole produced by the method of claim 1.

25. In the method of manufacturing a molded innersole for use in footwear, which method comprises:
    (a) introducing an expandable, reactable, low compression set polyurethane material into a mold cavity;
    (b) introducing a flexible top sheet material into the mold cavity for direct bonding to the expandable polyurethane material and permitting the introduced polyurethane material in the mold cavity to expand and react to form an elastomeric, open-celled polyurethane foam innersole body comprising a heel and arch sectio and a relatively flat ball and toe section, the urethane foam material directly bonded to the flexible top sheet material; and
    (c) recovering a full-sole molded innersole, the improvement of which comprises:
        (i) inserting a preformed, solid elastomeric polyurethane insert material into the mold cavity in a position to provide for a shock-absorbing heel or in the ball or both sections of the whole body innersole prior to the introduction of the expandable polyurethane material and the flexible top sheet material, the insert material having greater shock-absorbing properties than the polyurethane foam material and having a greater surface tack than the polyurethane foam material, the surface tack sufficient to permit the insert material to remain in place in the mold cavity on the introduction of the expandable polyurethane material; and
        (ii) recovering a molded, full-sole innersole, the insert material having the tacky surface forming an exposed part of the bottom surface of the innersole.

26. The method of claim 25 wherein the insert material comprises an elastomeric polyurethane having a compression set of about less 15% and a Shore hardness of about 10 to 80.

27. The molded innersole produced by the method of claim 25.

* * * * *